United States Patent [19]

Williams

[11] Patent Number: 5,044,337
[45] Date of Patent: Sep. 3, 1991

[54] CONTROL SYSTEM FOR AND METHOD OF CONTROLLING AN INTERNAL COMBUSTION ENGINE

[75] Inventor: David Williams, Kingsbury, Great Britain

[73] Assignee: Lucas Industries public limited company, Birmingham, England

[21] Appl. No.: 425,039

[22] Filed: Oct. 23, 1989

[30] Foreign Application Priority Data

Oct. 27, 1988 [GB] United Kingdom ............... 8825213

[51] Int. Cl.⁵ .............................................. F02M 7/00
[52] U.S. Cl. ................................................. 123/436
[58] Field of Search ....................... 123/419, 435, 436; 364/431.08

[56] References Cited

U.S. PATENT DOCUMENTS

| | | | |
|---|---|---|---|
| 4,368,707 | 1/1983 | Leshner et al. | 123/436 |
| 4,478,185 | 10/1984 | Obayashi et al. | 123/419 |
| 4,513,721 | 4/1985 | Ina et al. | 123/419 |
| 4,543,934 | 10/1985 | Morita et al. | 123/436 |
| 4,561,389 | 12/1985 | Matsumoto | 123/435 |
| 4,683,856 | 8/1987 | Matsuura et al. | 123/419 |
| 4,823,270 | 4/1989 | Nagai | 123/440 |
| 4,829,963 | 5/1989 | Oblaender et al. | 123/436 |
| 4,883,038 | 11/1989 | Nakaniwa | 123/436 |

FOREIGN PATENT DOCUMENTS 0062661 4/1985 Japan ................................. 123/419

Primary Examiner—Tony M. Argenbright
Assistant Examiner—Robert E. Mates
Attorney, Agent, or Firm—Nixon & Vanderhye

[57] ABSTRACT

A control system is provided for controlling the composition of a gas and fuel mixture supplied to an internal combustion engine. The output of an engine roughness detector (spark ignition engine) or an exhaust smoke detector (compression ignition engine) is compared with a limit value to provide a correction to a base value of mixture composition from a look up table. The magnitude of the correction is limited to a predetermined value and the corrected base value controls the composition of the mixture supplied to the engine.

22 Claims, 4 Drawing Sheets

CONTROL SYSTEM FOR AND METHOD OF CONTROLLING AN INTERNAL COMBUSTION ENGINE

BACKGROUND OF THE INVENTION

1. Field of the Invention

This invention relates to a control system for an internal combustion engine and particularly to a system for controlling the composition of the gas and fuel mixture used in the combustion process occurring in such an engine. The invention also relates to a method of controlling an internal combustion engine.

A modern engine control system comprises look up tables which are addressed by the outputs of sensors for measuring engine operating conditions such as engine speed and load. In an open loop system, the outputs of the look up tables are used directly for providing control signals for control devices. In a spark ignition engine, the control devices comprise a device for controlling the timing of the ignition sparks and a device for controlling the composition of the fuel mixture. Manufacturing tolerances in the sensors and control devices together with changes which may result from drift and wear of these components in service cause differences between actual values of ignition timing and mixture composition and their designed values. Mixture composition is particularly prone to such differences.

There are many situations where these differences must be kept under control as there exists a finite operating window within which the system must operate to avoid constraints on engine performance. An example of such an operating window is provided by a lean burn spark ignition engine. In a lean burn engine, the combustion mixture contains air and fuel in proportions which are leaner than stoichiometric. This window is illustrated in FIG. 1 which is a graph of emissions of nitrogen oxides (NOx) against air to fuel ratio. As shown, a lean burn engine should operate within a window M between a rich limit AF1 beyond which there is a danger of excessive NOx emissions and a lean limit AF2 beyond which there is a danger of excessive engine roughness. Engine roughness may be defined as variations in work output occurring between successive combustion events or periods. Ideally, a feedback system for such an engine would incorporate both a NOx sensor and a roughness sensor to ensure that both constraints were met and that the engine operates within the window M. However, at present there is no suitable NOx sensor for engine control and such a sensor, if it existed, would add to the cost and complexity of the control system.

It is current practice to operate lean burn engines with a design value for the air to fuel ratio which is spaced by a safety margin from the lean limit (AF2 in FIG. 1) corresponding to the onset of excessive engine roughness. Referring to FIG. 2, there is shown a distribution D1 of actual air to fuel ratios about their design value. As mentioned above, this distribution is caused by manufacturing tolerances and drift and wear of sensors and control devices. This distribution has an approximate spread of M1. There are a number of variables for production engines in service which give rise to different levels of engine roughness at the same air to fuel ratio with the same fuel. These variables include differences between individual engines, differences between ignition systems and atmospheric variables. Referring to FIG. 3, there is shown a distribution D2 for air to fuel ratio for a fleet of production engines for a particular value of engine roughness. This distribution has an approximate spread of M2. In order to ensure that any engine out of a fleet of engines has a very low probability of suffering excessive engine roughness, the design value for the air to fuel ratio must be spaced from the value corresponding to the onset of excessive engine roughness by a safety margin of $(M1+M2)/2$. As a result of providing this safety margin, the majority of the engines of the fleet are operated with a fuel mixture which is richer than necessary and so the NOx emissions from these engines are higher than necessary. In the future, legislation will require a reduction in the emissions of NOx and this, in turn, will lead to a reduction in the safety margin. This reduction in the safety margin will increase the probability of engine roughness in service and this makes it desirable to provide a roughness feedback.

In U.S. Pat. No. 4,368,707, there is described an engine control system in which the air to fuel ratio is controlled so as to achieve a predetermined and acceptable roughness level. However, there are a number of disadvantages in operating an engine in this way. It is generally undesirable to operate an engine at a roughness level which is close to the limit value corresponding to the onset of excessive engine roughness. If an engine is operated close to this limit value, then a lean excursion, as might occur during rapid throttle opening, could lead to an unacceptably high level of roughness. On the other hand, if the engine is operated with a roughness level which is well spaced from the limit value, there is an increased risk of excessive NOx emission from some engines due to an over rich combustion mixture. Under legislation relating to NOx emissions, it is necessary to demonstrate that engines in service would have NOx emissions within the legal limit. In the case in which the air to fuel ratio is controlled so as to achieve a predetermined roughness value, this is difficult to demonstrate. The nature of the variables which give rise to changes in the air to fuel ratio for a particular roughness level is such that it is difficult to obtain the necessary data. Also, the spread of air to fuel ratios in an engine in which this ratio is controlled to achieve a predetermined roughness value can be greater than the spread in an open loop system. More generally, if the air to fuel ratio is controlled so as to achieve a predetermined roughness level, this removes the freedom of the designer to control the air to fuel ratio in accordance with other constraints.

In the case of a compression ignition engine provided with exhaust gas recirculation, there is a finite operating window for the level of exhaust gas recirculation which is generally analogous to that described above in relation to a spark ignition engine. In the case of a compression ignition engine, this window is bounded by a low level limit corresponding to the onset of excessive NOx emissions and a high level limit corresponding to the onset of production of black smoke particulates in the exhaust gas.

SUMMARY OF THE INVENTION

It is accordingly an object of this invention to provide a new or improved control system for an internal combustion engine and also a new or improved method of controlling such an engine in which the above mentioned disadvantages are overcome or reduced.

According to one aspect of this invention, there is provided a control system for an internal combustion engine having a device for controlling the composition of a gas and fuel mixture used in a combustion process occurring in the engine, the system comprising means for establishing a base control signal for the mixture control device, means for detecting an undesirable occurrence in the combustion process, and means for applying a correction to the base control signal for the mixture control device upon detecting the undesirable occurrence, the correction being applied in a direction which avoids the undesirable occurrence, characterized by means for limiting the magnitude of the correction to a predetermined value.

In the control system of the present invention, the safety margin between the design value for the composition of the combustion mixture and the value corresponding to an undesirable occurrence may be reduced in comparison with engines which use an open loop system for controlling the composition of the combustion mixture.

The base control signal for the mixture control device may be established in accordance with engine operating conditions. The predetermined value to which the magnitude of said correction is limited may be established in accordance with engine operating conditions.

Conveniently, the detecting means comprises means for measuring a parameter related to the combustion process and means for comparing the measured value of the combustion parameter with a threshold value. The threshold value may be established in accordance with engine operating conditions.

The base control signal for the mixture control device may be established so that the air and fuel in the combustion mixture are usually present in proportions which are leaner than stoichiometric.

In a spark ignition engine, the mixture control device may be a device for controlling the air to fuel ratio of the combustion mixture or a device for controlling the dilution of the combustion mixture with exhaust gas.

In a spark ignition engine, the undesirable occurrence may be an undesirably high level of engine roughness. Engine roughness may be calculated from variations in engine speed occurring between successive engine combustion events.

In a compression ignition engine, the mixture control device may be a device for controlling the dilution of the combustion mixture with exhaust gas.

In a compression ignition engine, the undesirable occurrence may be an undesirably high level of black smoke particulates in the exhaust gas.

According to another aspect of this invention, there is provided a method of controlling an internal combustion engine, comprising the steps of: establishing a base value for the composition of a gas and fuel mixture used in a combustion process occurring in the engine, detecting an undesirable occurrence in the combustion process, applying a correction to the base value for the combustion mixture upon detecting the undesirable occurrence, the correction being applied in a direction which avoids the undesirable occurrence, and limiting the magnitude of the correction to a predetermined value.

BRIEF DESCRIPTION OF THE DRAWINGS

This invention will now be described in more detail, by way of example, with reference to the drawings, in which.

DETAILED DESCRIPTION OF PREFERRED EMBODIMENTS

Figure 4:
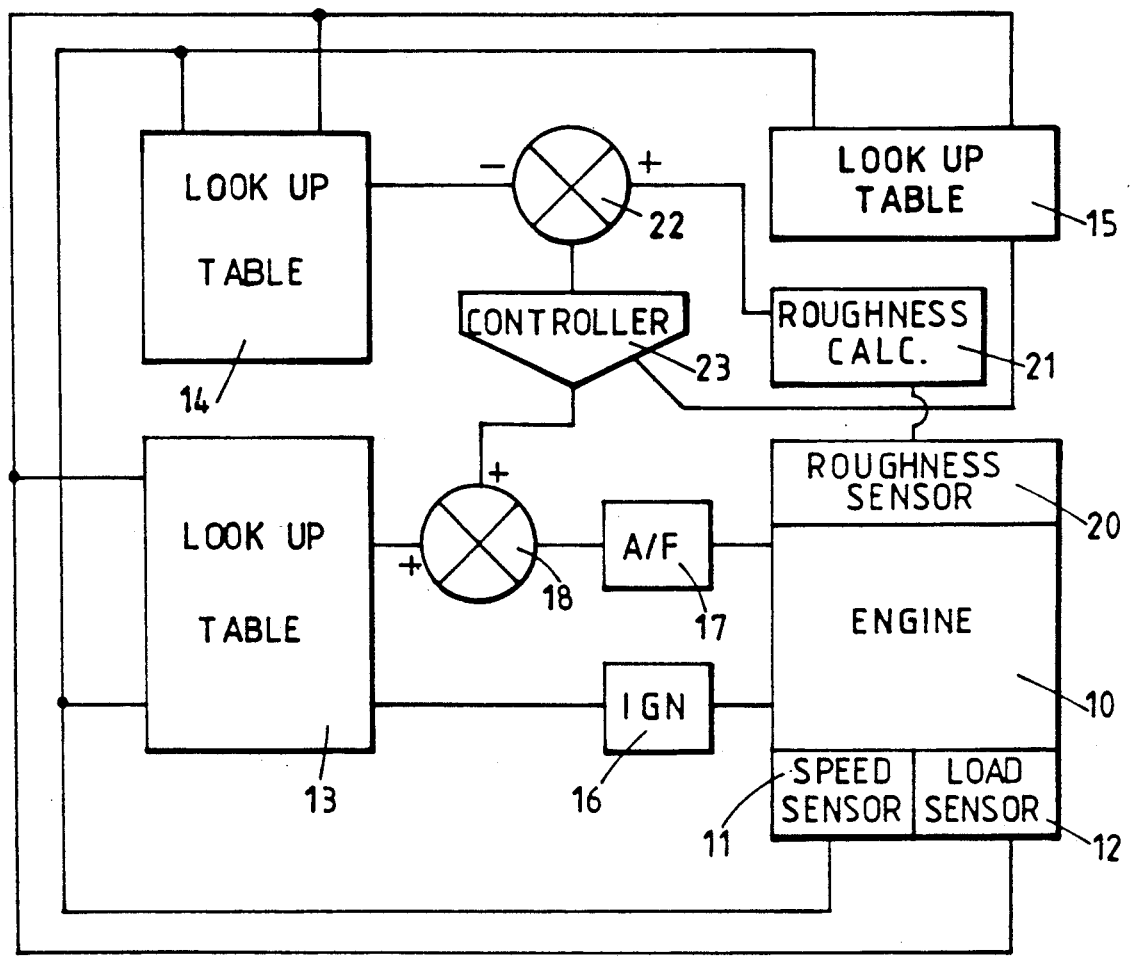
FIG. 4 is a block diagram of a control system for a spark ignition engine embodying this invention.

Referring now to FIG. 4, there is shown a control system for a multicylinder spark ignition engine 10. The engine 10 has an engine speed sensor 11 and a load sensor 12. In this example, the load sensor 12 measures the depression prevailing in the inlet manifold leading to the combustion chambers. The outputs of the speed sensor 11 and load sensor 12 are provided to the address inputs of three look up tables 13, 14, 15. The engine also includes a device 16 for controlling ignition timing and a device for controlling the air to fuel ratio of the mixture supplied to the combustion chambers. In this example, the device 16 is a drive circuit for the ignition coil of the engine and the device 17 is a drive circuit for fuel injectors which supply fuel to the combustion chambers.

The look up table 13 contains a schedule of ignition timing values and a schedule of air to fuel ratio values, the values in each schedule being stored as a function of engine speed and load. The look up table 13 outputs a control signal to the control device 16 representing the design value for ignition timing for the prevailing engine speed and load. Also, the look up table 13 supplies a signal to an input of a summer 18 representing a design or base value for the air to fuel ratio. The output of summer 18 is supplied as a control signal to the control device 17.

The engine 10 is provided with a roughness sensor 20 which, in the present example, measures the duration of successive combustion cycles. The output of roughness sensor 20 is supplied to a roughness calculator 21 which calculates the prevailing value of engine roughness from the variations in engine speed between successive combustion cycles. The output of roughness calculator 21 is supplied to the positive input of a subtractor 22. The look up table 14 contains a schedule of roughness values which are stored as a function of load and speed. Each roughness value represents the maximum roughness which is acceptable at its associated speed and load. The look up table 14 supplies a signal representing the maximum acceptable value of engine roughness to the negative input of subtractor 22. At the output of subtractor 22, there is provided a signal which represents the difference between the actual engine roughness and the maximum acceptable value of engine roughness and this signal is supplied to an input of a controller 23.

The look up table 15 contains a schedule of limit values stored as a function of engine load and speed and this look up table supplies a signal representing the limit value for the prevailing speed and load to another input of controller 23. The controller 23 recognizes only positive signals (actual roughness greater than acceptable roughness) from subtractor 22 and operates on these signals, using a desired combination of proportional, integral and differential terms, to generate a correction signal which is supplied to a second input of summer 18. The controller 33 limits the magnitude of the correction signal to the present limit value received from the look up table 15. The polarity of the correction signal is such as to cause a reduction in air to fuel ratio, thereby causing an enrichment of the mixture supplied to the combustion chambers and a reduction in engine roughness. In the event that the engine roughness is less than the maximum acceptable value, no correction signal is generated.

The system of FIG. 4 may be modified to include a further look-up table addressed by engine speed and load and which stores correction values from the controller 23 and supplies them to summer 18. This modification would provide an adaptive system in which correction values were available immediately when the engine returned to a given speed and load site.

Figure 1:
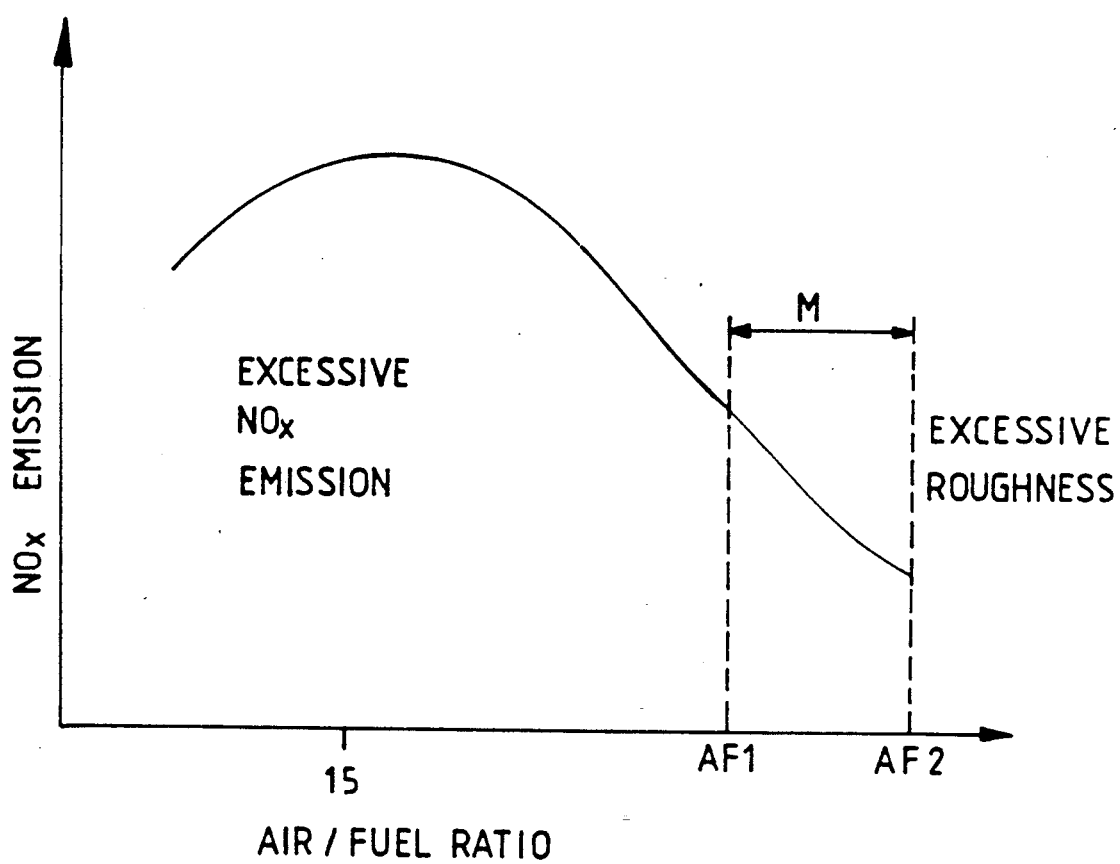
FIG. 1 is a graph of emissions of nitrogen oxides against air to fuel ratio for a spark ignition engine.
Figure 2:
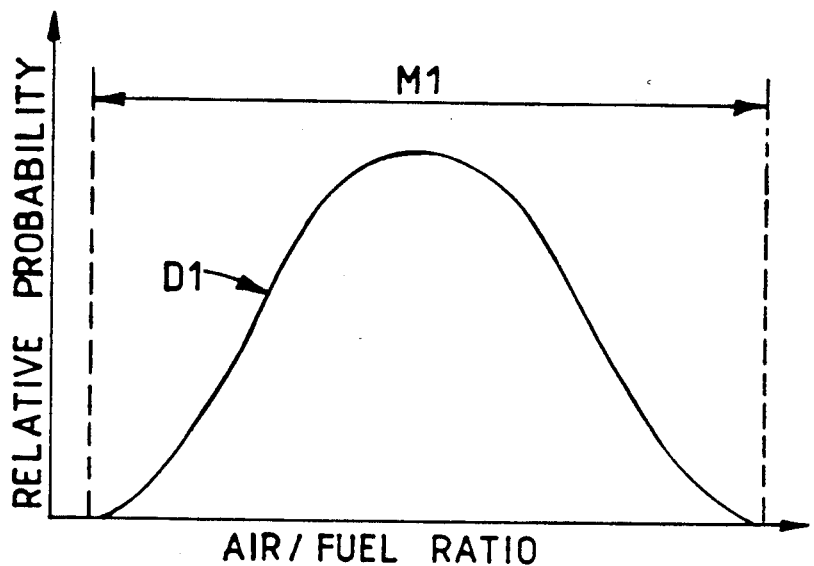
FIG. 2 is a graph showing the distribution of actual air to fuel ratios in a fleet of engines in comparison with the design value for the air to fuel ratio.
Figure 3:
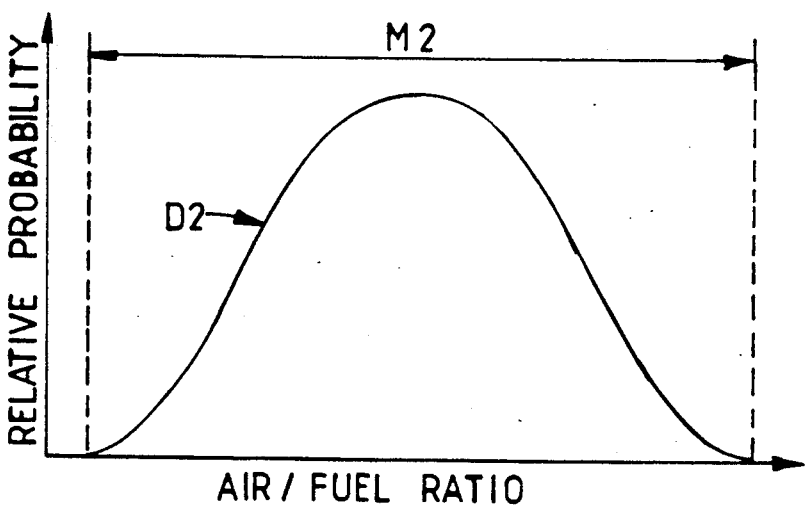
FIG. 3 is a graph showing the distribution of air to fuel ratios in a fleet of combustion engines giving a particular level of engine roughness.
Figure 5:
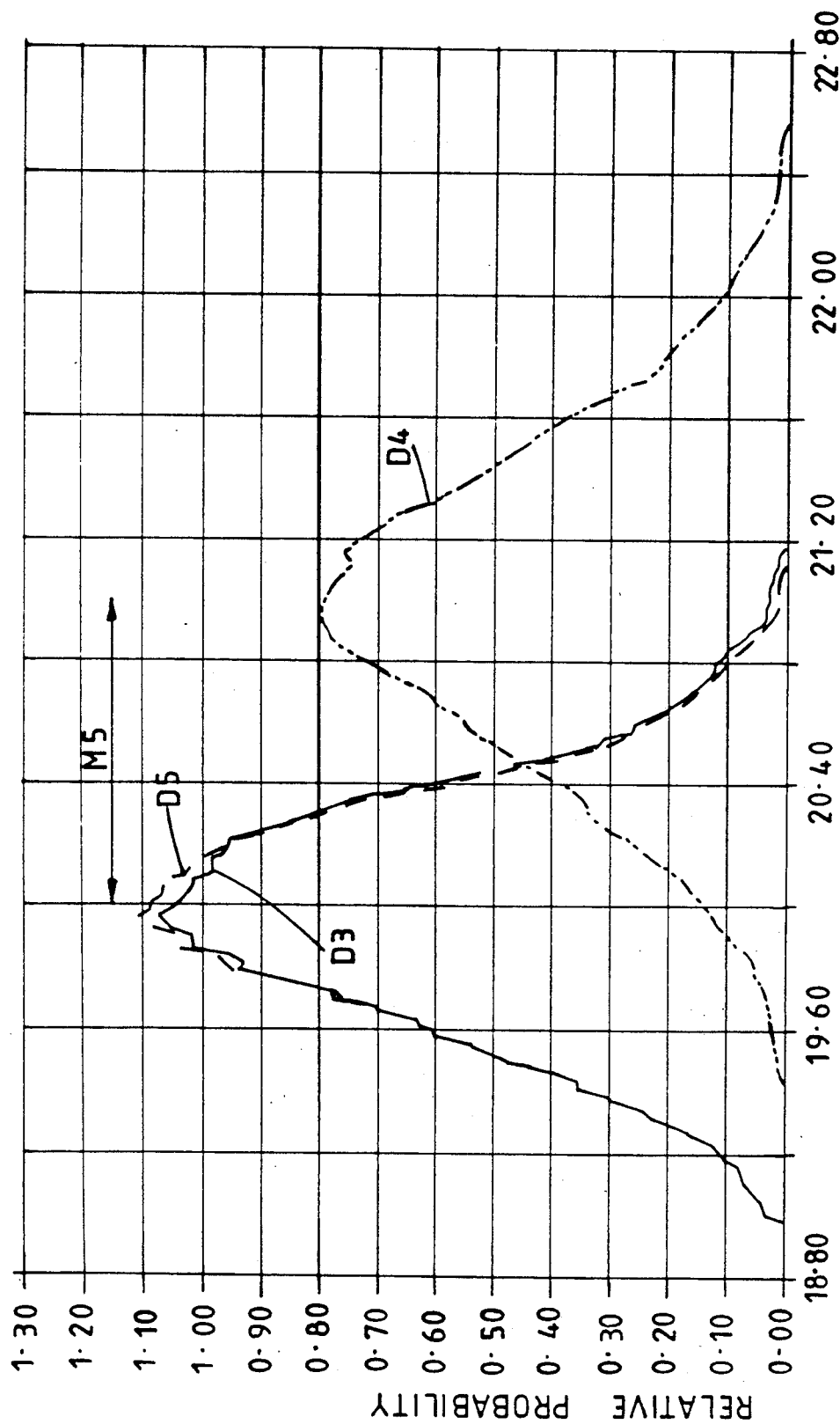
FIG. 5 is a graph showing the distribution of air to fuel ratios in relation to the design value for the air to fuel ratio occurring in a fleet of engines having a control system of FIG. 4.

As has been mentioned in relation to FIGS. 2 and 3, there are distributions in a fleet of engines of both the actual air to fuel ratio with respect to the design value and the air to fuel ratio at which a particular value of engine roughness occurs. In FIG. 5, there are shown a distribution D3 (generally similar to distribution D1 of FIG. 2) of actual air to fuel ratio with respect to the design value with open loop control for a particular fleet of engines and a distribution D4 (generally similar to distribution D2 of FIG. 3) of air to fuel ratio at which the maximum acceptable engine roughness occurs for the same particular fleet of engines. The distributions D3 and D4 have approximate spreads M3 and M4. The distributions D3 and D4 intersect and so, with an open loop control system for controlling the air to fuel ratio, a number of engines suffer unacceptable engine roughness.

In implementing the control system of FIG. 4 for engines having distributions D3, D4, the magnitude of the correction signal is limited to the magnitude of the intersection of distributions D3, D4. By statistical modelling, it can be shown that the resulting distributions of the air to fuel ratio about the design value is as shown by distribution D5 in FIG. 5. The spread of distribution D5 is reduced by only a small amount relative to the original distribution D3. However, the safety margin M5, which is necessary to avoid excessive engine roughness, between the design value for the air to fuel ratio setting and the mean value of the air to fuel ratio corresponding to the maximum acceptable engine roughness is greatly reduced in comparison with an open loop control system. Specifically, M5 is less than $(M3+M4)/2$.

As distribution D5 is very similar to the distribution D3 for open loop control it represents a predictable distribution of actual air to fuel ratio values which will occur in a fleet of engines, and so it can be used, for emissions legislation purposes, to demonstrate the NOx emissions which are to be expected.

In comparison with an open loop system, the system of FIG. 4 has the further advantage that it can be designed to operate with a leaner air to fuel mixture than is the case for the open loop system as the safety margin to the roughness limit can be reduced. Consequently, the average NOx emissions for a fleet of engines would be less than for an open loop system.

The system of FIG. 4 has two important advantages over a feedback system in which air to fuel ratio is varied so as to achieve a constant roughness value. Firstly, in the system of FIG. 4, the designer is free to select a value for the air to fuel ratio with the knowledge that the selected value will only be overridden by the roughness feedback loop in a small proportion of engines. Secondly, because the magnitude of the correction signal is limited, there is no risk of excessive NOx emissions occurring in any engine.

In the system shown in FIG. 4, the roughness sensor detects the duration of each combustion cycle. There are alternative ways of measuring roughness. For example, roughness could be measured with a cylinder pressure sensor, an ionization sensor in the exhaust gas or by a sensor which measures engine vibrations.

In the system shown in FIG. 4, a single correction signal is used for controlling the air to fuel ratio in all combustion chambers. By way of modification, an individual correction signal could be supplied for each combustion chamber. In this case, it would be necessary to obtain a roughness measurement for each cylinder. For a particular cylinder, this could be achieved by measuring its combustion period in successive engine cycles and calculating the roughness from the variation of the combustion period for that cylinder between successive engine cycles.

In a spark ignition engine which is provided with exhaust gas recirculation, the system of FIG. 4 could be modified so as to control the level of recirculation. This could be achieved by replacing the air to fuel ratio control device 17 with a device for controlling exhaust gas recirculation.

The look up tables 14 and 15 enable the designer to make the maximum acceptable roughness value and the limit value for the magnitude of the correction signal into functions of the engine operating conditions. By way of simplification, the tables 14 and 15 could be replaced by fixed values for all engine operating conditions.

The general principles of the system of FIG. 4 could be adapted for use in a compression ignition engine provided with exhaust gas recirculation. In such an engine, as mentioned above, there is a finite operating window for the level of exhaust gas recirculation which is bounded at one end by the onset of excessive NOx emissions and at the other end by the onset of excessive emissions of black smoke particulates. In modifying the system of FIG. 4 for use in such an engine, the control device 17 would be replaced by a device for controlling exhaust gas recirculation, the roughness sensor 20 and roughness calculator 21 would be replaced by a smoke particulate sensor. The ignition timing control device 16 could be replaced by a drive circuit for the fuel injectors. Appropriate schedules would be stored in look up tables 13, 14, 15.

I claim:

1. A method of controlling an internal combustion engine of a predetermined type, said method comprising the steps of:

determining a first distribution of actual engine control parameters corresponding to at least a first demanded engine control parameter supplied to a first plurality of internal combustion engines of said predetermined type;

determining a second distribution of second demanded engine control parameters supplied to a second plurality of internal combustion engines of said predetermined type, where, above said second demanded engine control parameter, processes in the internal combustion engines of the second plurality of engines become unacceptable;

determining a limit value as a magnitude of engine control parameters at an intersection of said first and second distributions;

establishing a base value of said engine control parameter used in a combustion process occurring in the internal combustion engine of said predetermined type;

detecting when the combustion process becomes unacceptable;

applying a correction to said base value upon detecting that the combustion process has become unacceptable, said correction being applied in a direction which makes the combustion process more acceptable; and limiting in magnitude said correction to the limit value.

2. A method as claimed in claim 1, in which the base value is established in accordance with engine operating conditions.

3. A method as claimed in claim 2, in which the engine operating conditions are engine speed and engine load.

4. A method as claimed in claim 1, in which the limit value is established in accordance with engine operating conditions.

5. A method as claimed in claim 4, in which the engine operating conditions are engine speed and engine load.

6. A method as claimed in claim 1, in which said detecting step comprises measuring a measured value of a parameter related to the combustion process and comparing the measured value with a threshold value.

7. A method as claimed in claim 6, in which the threshold value is established in accordance with engine operating conditions.

8. A method as claimed in claim 7, in which the engine operating conditions are engine speed and engine load.

9. A method as claimed in claim 1 for a spark ignition engine in which the unacceptable combustion process is an undesirably high level of engine roughness.

10. A method as claimed in claim 1, in which the engine control parameter is gas to fuel ratio of a combustible mixture and said applying step applies the correction in a direction to reduce the gas to fuel ratio.

11. A method as claimed in claim 10, in which the base value corresponds to a leaner than stoichiometric combustion mixture.

12. An apparatus for controlling an internal combustion engine of a predetermined type by means of varying an engine control parameter where an internal combustion process of such engine becomes unacceptable at some value of said engine control parameter, said apparatus comprising:

means for establishing a base value of said engine control parameter used in a combustion process occurring in said internal combustion engine of said predetermined type;

means for detecting when said combustion process becomes unacceptable;

means, responsive to said means for detecting, for applying a correction to said base value when said combustion process has become unacceptable, said correction being applied in a direction which makes the combustion process more acceptable;

means for limiting in magnitude said correction applied by said applying means, to a limit value, said limiting means including means for storing a limit value which is a magnitude of said engine control parameter at an intersection of first and second distributions, said first distribution comprising actual engine control parameters corresponding to demanded engine control parameters for a first plurality of engines of said predetermined type, and said second distribution comprising second demanded engine control parameters of a magnitude above which magnitude processes in said internal combustion engines become unacceptable.

13. The apparatus according to claim 12, wherein said engine control parameter is gas to fuel ratio of a combustible mixture and said means for applying includes means for applying the correction in a direction so as to reduce the gas to fuel ratio.

14. An apparatus as claimed in claim 12, wherein said base value is established in accordance with engine operating conditions.

15. An apparatus as claimed in claim 14, wherein said engine operating conditions are engine speed and engine load.

16. An apparatus as claimed in claim 12, wherein said limit value is established in accordance with engine operating conditions.

17. An apparatus as claimed in claim 16, wherein said engine operating conditions are engine speed and engine load.

18. An apparatus as claimed in claim 12, wherein said detecting means comprises means for measuring a measured value of a parameter related to the combustion process and comparing said measured value with a threshold value.

19. An apparatus as claimed in claim 18, wherein said threshold value is established in accordance with engine operating conditions.

20. An apparatus as claimed in claim 19, wherein said engine operating conditions are engine speed and engine load.

21. An apparatus as claimed in claim 13, wherein said base vale corresponds to a leaner than stoichiometric combustion mixture.

22. An apparatus as claimed in claim 12, wherein said engine is a spark ignition engine and said unacceptable combustion process is an undesirably high level of engine roughness.

* * * * *